(12) United States Patent
Cavallo et al.

(10) Patent No.: US 6,235,841 B1
(45) Date of Patent: May 22, 2001

(54) HYDROGENATED BLOCK COPOLYMERS HAVING A PARTIALLY BRANCHED STRUCTURE

(75) Inventors: Claudio Cavallo, Forli'; Sergio Custro, Ravenna; Gian Tommaso Viola, Cervia, all of (IT)

(73) Assignee: Enichem S.p.A., San Donato Milanese (IT)

( * ) Notice: Subject to any disclaimer, the term of this patent is extended or adjusted under 35 U.S.C. 154(b) by 0 days.

(21) Appl. No.: 09/387,798

(22) Filed: Sep. 1, 1999

(30) Foreign Application Priority Data

Sep. 4, 1998 (IT) ................................ MI98A1960

(51) Int. Cl.⁷ .................................... C08L 53/02
(52) U.S. Cl. .............................. 525/89; 525/98; 524/504; 524/505
(58) Field of Search ..................... 525/89, 98; 524/504, 524/505; 523/173

(56) References Cited

U.S. PATENT DOCUMENTS 5,627,234 * 5/1997 Giordano et al. ...................... 525/89
5,705,556 * 1/1998 Dijauw et al. ....................... 524/505

* cited by examiner

*Primary Examiner*—James J. Seidleck
*Assistant Examiner*—Olga Asinovsky
(74) *Attorney, Agent, or Firm*—Oblon, Spivak, McClelland, Maier & Neustadt, P.C.

(57) ABSTRACT

Composition of vinylarene/hydrogenated diene block copolymers, the latter being selected from ethylene-butene and ethylene-propylene, characterized in that it comprises:

a) copolymers having linear structures from 30% to 60% by weight, preferably from 35% to 50%;

b) copolymers having branched structures from 70% to 40% by weight, preferably from 65% to 50%;

the sum of components (a) and (b) being equal to 100; the weight average molecular weight of the above composition ranging from 30,000 to 400,000, preferably from 50,000 to 200,000.

16 Claims, 2 Drawing Sheets

HYDROGENATED BLOCK COPOLYMERS HAVING A PARTIALLY BRANCHED STRUCTURE

BACKGROUND OF THE INVENTION

The present invention relates to a composition of hydrogenated block copolymers having an optimum balance between mechanical properties and rheological properties.

The present invention also relates to the process for the preparation of the above copolymers.

DESCRIPTION OF RELATED ART

Vinyl-arene/hydrogenated diene block copolymers are characterized by a very high viscosity compared with analogous non-hydrogenated products. From the point of view of application, this characteristic represents a great limit; it is therefore often necessary to resort to formulations in which the copolymer is diluted with fillers or other polymers having a lower viscosity. This often causes a reduction in the mechanical properties of the mixture and can therefore not always be put into use.

A partial first solution of the above problem is the use of linear multi-block structures (see for example U.S. Pat. No. 5,164,455) and star structures of the (AB)$_x$ type wherein x is a number from 3 to 6.

These copolymers, both with a linear multi-block and star structure, also have the disadvantage of not being entirely suitable for balancing the rheological properties with the mechanical properties.

A composition of block copolymers has now been found, which overcomes the drawbacks described above.

DETAILED DESCRIPTION OF THE INVENTION

Figure 1:
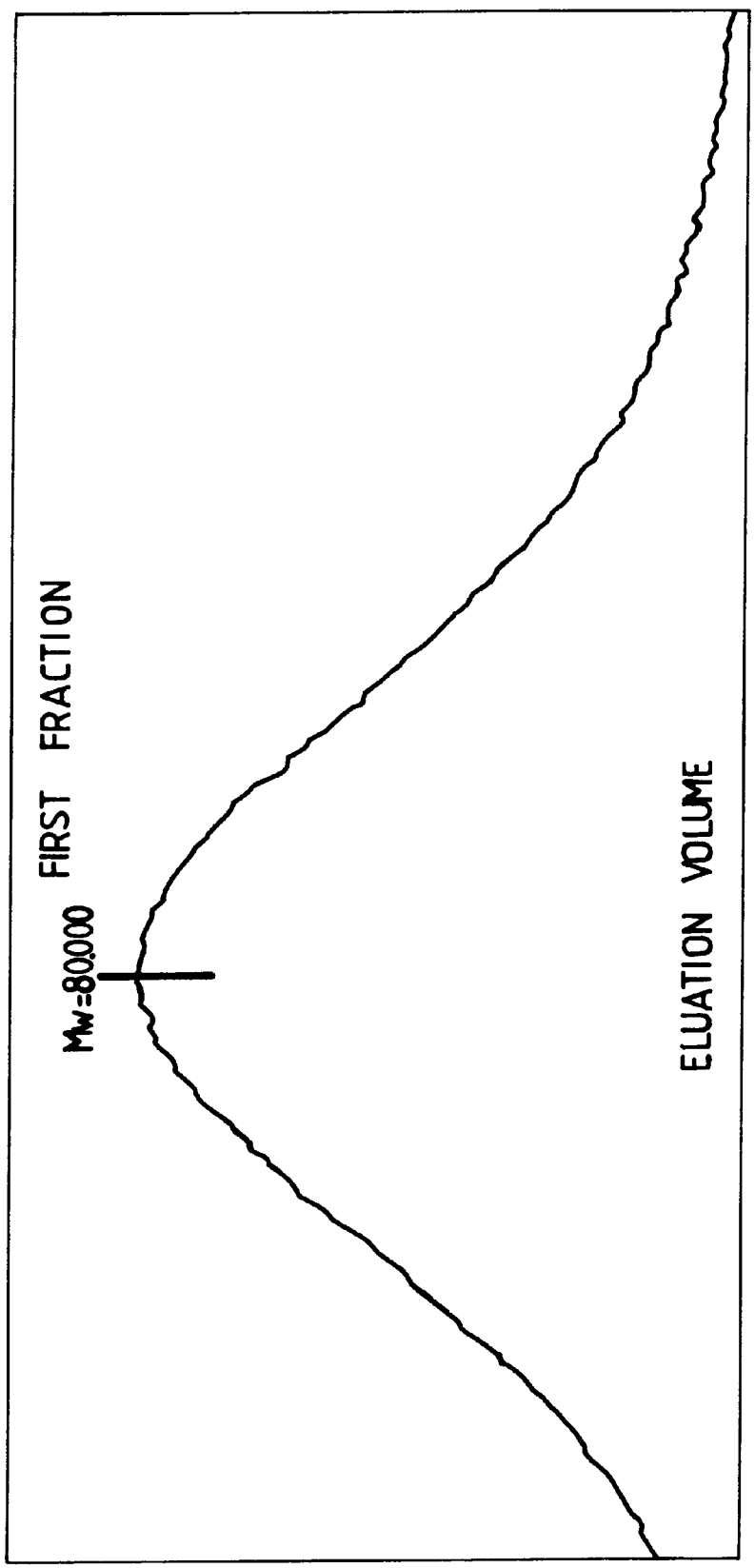
FIGS. 1 and 2 show GPC results from Example 1.

In accordance with this, the present invention relates, to a composition of vinylarene/hydrogenated diene block copolymers, the latter selected from ethylene-butene and ethylene-propylene, characterized in that it comprises:

(a) from 30% to 60% by weight, preferably from 35% to 50%, of copolymers having linear structures;

(b) from 70% to 40% by weight, preferably from 65% to 50%, of copolymers having branched structures;

the sum of components (a) and (b) being equal to 100; the weight average molecular weight of the above composition ranging from 30,000 to 400,000, preferably from 50,000 to 200,000.

The weight content of vinylarene in the polymeric composition of the present invention ranges from 2 to 75%, preferably from 5 to 40%, with a weight percentage of block vinylarene ranging from 50% to 100% of the total vinylarene. The vinylarene content can be regulated as desired depending on the end use of the polymeric composition of the present invention.

In the preferred embodiment the vinylarene is styrene.

The term "linear structures" refers to structures of the type (A—B)$_a$ and (B—TA—B)$_a$ wherein A, B, T will be defined further on and "a" indicates the number of blocks and is an integer ranging from 1 to 3.

The term "branched structures" refers to structures selected from those having general formula (I)

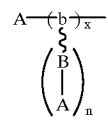

(I)

wherein:
1) A is the polyvinylarene block;
2) b is the monomeric unit of hydrogenated diene, selected from ethylene-butene and ethylene-propylene;
3) x is the number of monomeric units which form the ethylene-butene or ethylene-propylene block;
4) B is the hydrogenated polydiene block-(b)$_x$—;
5) n is the number of branches of the copolymer and is an integer ranging from 1 to 5;
6) B—A is the block copolymer grafted onto the hydrogenated polydiene fraction —(—b—)$_x$—;

or from those having general formula (II):

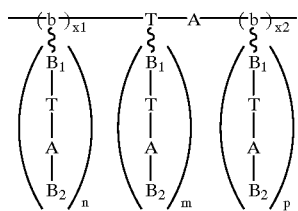

(II)

wherein:
7) A, B and b have the meaning defined above;
8) $x_1$ and $x_2$ are the number of hydrogenated diene monomeric units which form the two ethylene/butene or ethylene/propylene blocks;
9) T is the statistic terpolymer consisting of vinylarene/ethylene-butene or vinylarene/ethylene-propylene, the content of T being from 0 to 30% by weight of the compound having general formula (II);
10) —B$_1$—T—A—B$_2$ is the block copolymer grafted onto-(—b—)$_{x1}$—T—A—(—b—)$_{x2}$—;
11) (m+n+p) is the number of branches of the copolymer —B$_1$—T—A—B$_2$ grafted and ranges from 1 to 5.

The composition of the present invention can be obtained by means of a particular process which comprises the use of a hydrocarbon monobromo-derivative, particularly a monobromo alkyl derivative, with the formation of a "parent" polymer subsequently subjected to selective hydrogenation.

The composition of the present invention has an excellent balance of rheological properties and technological properties.

The present invention also relates to a process for the preparation of the polymeric composition defined above which comprises the following steps:

a) reaction of a vinylarene, as such or mixed with a conjugated diene, with an organo-derivative of Lithium having the general formula R—Li wherein R is a monofunctional hydrocarbon radical selected from aliphatic and cycloaliphatic radicals with from 2 to 20 carbon atoms;

b) reaction of the mixture coming from step (a) with a conjugated diene;

c) reaction of the mixture coming from step (b) with a bromo-derivative having the general formula R'—Br in an essentially stoichiometric quantity with respect to the Lithium, wherein R' is a C$_1$-C$_{10}$ monofunctional hydrocarbon radical selected from alkyl, cycloalkyl and aryl radicals, R' is preferably a $C_1$–$C_3$ alkyl radical, even more preferably R' is ethyl; thus obtaining a composition of non-hydrogenated block copolymers;

d) hydrogenation of the polydiene section of the composition of non-hydrogenated block copolymers obtained in step (c) to give the composition of hydrogenated block copolymers of the present invention.

In the process described above, the bromo-derivative having general formula R'—Br acts as both branching agent and quenching agent and consequently an additional quenching step with reagents such as water and alcohols is not required.

Step (a) of the process consists in reacting the vinylarene (optionally mixed with the diene), preferably styrene, and the organo-alkyl derivative of lithium in an inert solvent with the formation of a living polymer having a simplified A—Li structure. Other vinyl arenes which can be used for the formation of the non-elastomeric thermoplastic block A, are alpha methyl styrene, terbutylstyrene and other styrenes alkylated in the ring and relative mixtures.

The inert solvent which can be used in step (a) can be an aromatic or naphthene hydrocarbon, for example benzene or cyclohexane, optionally modified by the presence of alkanes and alkenes, for example pentenes or pentanes. Examples of suitable solvents are toluene, benzene, xylene, cyclohexane, optionally mixed with n-pentane, n-hexane, isooctane.

Examples of the organo-derivative of Lithium having formula R—Li are ethyl Lithium, n-propyl Lithium, isopropyl Lithium, n-butyl Lithium, sec-butyl Lithium, terbutyl Lithium, ter-octyl Lithium, decyl Lithium. The organo-derivative of Lithium is preferably selected from n-butyl Lithium and sec-butyl Lithium. The concentration of the Lithium alkyl initiator can be modified to control the molecular weight. The concentration of the above initiator generally ranges from 0.25 to 50 mmoles per 100 grams of monomer, even if there are no limits for using higher quantities.

The temperature during step (a) of the process of the present invention generally ranges from 10° C. to 80° C., preferably from 30° C. to 60° C., sufficient however to keep the monomers in liquid phase.

As soon as the whole vinylarene monomer, optionally mixed with the diene, has almost disappeared (and the living polymer has an A—Li structure), the conjugated diene having from 4 to 5 carbon atoms, preferably selected from isoprene and butadiene, even more preferably butadiene, is added (step b) to the solution obtained in step (a).

Once the diene-type monomer has been almost totally used up (consequently at the end of step (b)), the resulting polymer may have a block structure of the A—B—Li or $B_1TA$—$B_2$—Li type.

At the end of step (b), the polymeric solution is treated with the branching agent R'—Br at a temperature ranging from 40° C. to 120° C., preferably from 70° C. to 100° C. Examples of compounds having formula R'—Br which can be used in the present invention are monobromomethane, monobromoethane and upper homologous products, monobromocyclohexane, monobromobenzene and its alkyl derivatives. In the preferred embodiment, the compound having general formula R'—Br is monobromoethane. Step (c) is usually completed in a period of 5 to 30 minutes.

The polymer is then recovered and subjected to the hydrogenation process in which the polydiene part is selectively hydrogenated.

The hydrogenation process (step d) can be carried out using any of the processes known in the art for the hydrogenation of olefinic unsaturations in the presence of suitable catalysts. Among these, catalytic systems based on nickel carboxylates and aluminum alkyls, described in U.S. Pat. No. 3,431,323, or systems based on metallocene compounds of titanium and magnesium alkyls described in patent application MI97A 002477, can be mentioned.

The above hydrogenated compositions can be widely used in many fields of application, for example in the formulation of adhesives and seals, in the modification of plastic materials and mixtures of plastic materials.

A first application consists in the preparation of adhesive formulations. Block copolymers do not normally have sufficient adhesive properties to enable them to be used alone. It is therefore necessary to add tacking resins compatible with the elastomeric block of the hydrogenated conjugated diene. The quantity of tacking resin contained in the formulation of the present invention ranges from 50 to 200 parts per 100 parts of rubber (phr), preferably from 50 to 150 phr. The adhesive formulations of the present invention may optionally also contain fluidizing substances; among these liquid polyterpene resins can be mentioned. Stabilizers and oxygen inhibitors are usually added to protect the polymers against degradation during the preparation and use of the adhesive composition. Examples of antioxidants which are commercially available are Ionox® 220, i.e. 3,4,6-tris(3,5-di-t-butyl-p-hydroxybenzyl)-1,3,5-trime-thylbenzene, Irganox® 1010 (a terbutyl hydroxyphenyl propionate) and Irganox® 565 (or a thiotriazine derivative).

The "hot-melt" adhesive composition generally contains one or more antioxidants in a quantity ranging from about 0.01 to about 2.0% by weight.

The adhesive compositions of the present invention can be prepared by mixing in a solvent (for example toluene) the block copolymers, the tacking resin and fluidizing substances such as for example liquid resin, and stripping the solvent; alternatively the above compositions can be prepared by the simple mixing of the components at a high temperature, for example at about 150° C. (hot melt).

A preferred use of the polymeric compositions of the present invention, again in the field of adhesives, is in the preparation of adhesive tapes sensitive to pressure (PSA i.e. "pressure sensitive adhesives"), according to methods described in literature, for example in accordance with what is disclosed in U.S. Pat. No. 3,676,202, or in the preparation of lables.

A second application consists in the modification of engineering polymers, particularly polyesters, polyamides and polycarbonates, particularly polycarbonate. Polycarbonate is, in fact, particularly fragile at low temperatures (<0° C.) and cannot therefore be used as such in applications which comprise low operating temperatures. The addition to the polycarbonate of the polymeric composition of the present invention considerably increases the resistance to low temperatures of the end-articles based on polycarbonate, without jeopardizing the other properties. A further object of the present invention relates to a polymeric composition comprising engineering polymers, selected from polyesters, polyamides and polycarbonates, preferably polycarbonate, and the mixture of block copolymers of the present invention.

Another application of the polymeric composition of the present invention consists in rendering plastic materials compatible (for example polyethylene and polystyrene), which are otherwise incompatible, enabling the preparation of polymeric alloys having a combination of excellent properties. In accordance with this, the present invention also relates to a polymeric composition comprising polyethylene, polystyrene and the mixture of block copolymers of the present invention.

The following examples provide a better understanding of the present invention.

EXAMPLE 1

8400 grams of cyclohexane, 23 ml of a 2M solution of di-tetrahydrofuran-propane in cyclohexane and 240 grams of styrene are charged into a 25 liter autoclave. The system is thermostat-regulated at 50° C. and 20.6 ml of a 1.5M solution in n-hexane of sec-butyl-lithium are then added.

After 30 minutes 960 g of butadiene are added to the polymeric solution thus obtained and the mixture is then left to react for 15 minutes. 12.5 ml of a 1M solution in cyclohexane of monobromoethane are then added, at a temperature of 95° C., and the mixture is left to react for 15 minutes. The polymer thus obtained has a 1,2 chain percentage in the polybutadiene section equal to 60%.

4800 grams of the polymeric solution thus obtained are then transferred in an inert atmosphere (argon) to a 16 liter reactor and 0.310 g of bis cyclopentadienyltitanium dichloride and 0.904 g of dibutyl-magnesium suitably premixed in cyclohexane, are then added. The polymeric solution is then brought into an $H_2$ atmosphere (24 bars) and maintained at a temperature of 100° C. for 60 minutes.

The polymeric solution is subsequently discharged and antioxidant (Irganox® 1010, 0.1 phr with respect to the dry product) is added. The solvent is removed by distillation in a vapour stream and the polymer is dried on a fluid bed.

The polymer thus obtained has an average molecular weight (Mw) of 80,000 and consists of:
(a) a linear fraction (60%) having a molecular weight of 40,000;
(b) a branched fraction (40% by weight) having a molecular weight of 80,000 to 360,000.

The content of polystyrene with respect to the polymer, measured by means of Fourier transform infra-red spectrometry (FTIR), proved to be 20%. The hydrogenation degree of the polybutadiene section, measured by iodometric titration, is >97%, whereas the polystyrene section has a hydrogenation degree of <1%.

Characterization of the polymer.

The polymer thus obtained is separated into two fractions by means of the dissolution and subsequent precipitation technique. A sample of the polymer is dissolved in tetrahydrofuran (concentration of 0.5% by weight) at 23° C. Over a period of 12 hours the subsequent precipitation of two aliquots of solid (polymer) takes place by the addition of a weight quantity of ethyl alcohol equal to that of the tetrahydrofuran.

The two polymeric fractions were analyzed by means of gel permeation chromatography using a M.A.L.L.S. (Multi Angle Laser Light Scattering) detector. This technique allows the absolute molecular weight of the polymers to be determined and the branching degree of the various molecular species of which it is formed, to be accurately evaluated. This is made possible by the determination of the average square radius of the polymeric species dissolved in the solvent (the same used as in the gel permeation) obtained by light scattering.

Figure 2:
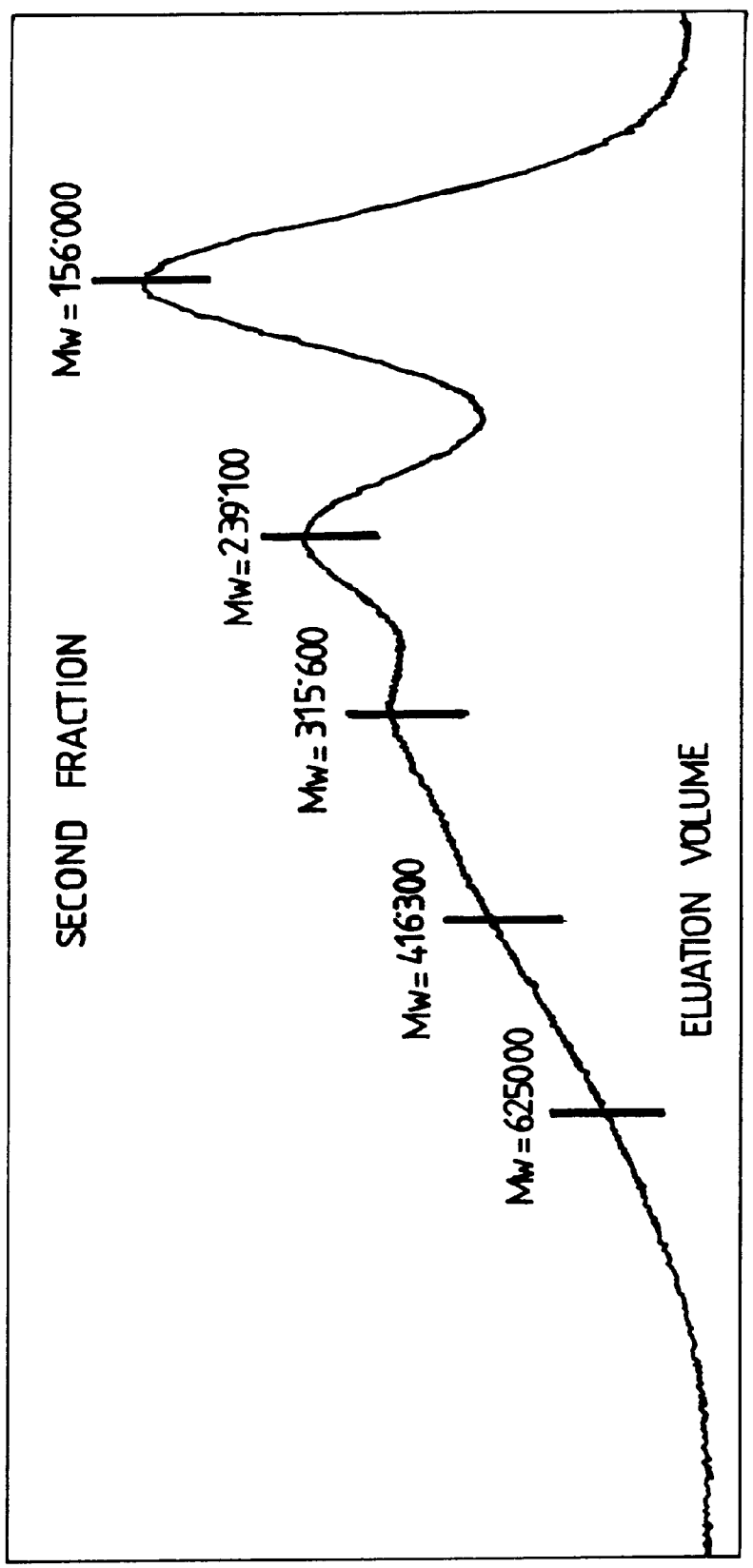

In the case in question the product is separated into two fractions: the first, corresponding to the product which precipitated after about 10 hours (lower molecular weight), has a weight average Molecular Weight Mw of 80,000, a Mw/Mn ratio of about 1 (typical value in living anionic polymerization) and an α value i.e. of the angular coefficient of the average square radius line against molecular weight $[<r>^2=f(Mw)]$, of about 0.6, a typical value of completely linear molecules (see G.P.C., FIG. 1). The second fraction corresponding to the solid precipitated after 4 hours (fraction with a higher molecular weight) has an Mw of 310,000 and consists of various molecular species (see G.P.C., FIG. 2) as it has an Mw/Mn of about 2.0. This second fraction also has an average α of 0.393, a value which indicates the presence of several molecular species with different branching degrees.

To obtain more accurate information on the molecular weight of the various species contained in fraction Nr. 2 and on their branching degree, and taking into account the mechanism assumed in Journal of Polymer Science, Part A, Polymer Chemistry Vol. 35, pages 17–25, linear molecules are synthesized, having multiple molecular weights with respect to those of the first fraction (80,000). In particular polymers were prepared having a molecular weight of 160,000, 240,000, 320,000, 400,000, 480,000.

The ratio between the average square radius of the various species present in fraction Nr. 2 and the average square radius of the equivalent linear model molecules (analysis effected by means of M.A.L.L.S.) enabled the presence of various molecular species having branching degrees ranging from 1 to 5 and molecular weights ranging from 160,000 to 480,000, to be identified.

Formulation of the polymer.

The polymer thus obtained is used for the preparation of an adhesive formulation with the hot-melt technology.

The following formulation is prepared:

| | |
|---|---|
| Polymer of example 1 | 100 parts by weight; |
| Escorex 5380 resin | 150 parts by weight; |
| Prisnol Oil | 40 parts by weight; |
| Antioxidants: | |
| Irganox ® 565 | 0.05 parts by weight; |
| Irganox ® 1010 | 0.1 parts by weight. |

The adhesive properties of this formulation are indicated in Table 1.

TABLE 1

| Properties | |
|---|---|
| Brookfield Viscosity at 140° C. (cps)-ASTM D3236 | 85,000 |
| Brookfield Viscosity at 160° C. (cps)-ASTM D3236 | 40,000 |
| Brookfield Viscosity at 180° C. (cps)-ASTM D3236 | 8,000 |
| Brookfield Viscosity at 180° C. after 4 days (cps)-ASTM D3236 | 8,000 |
| Polyten tack (g) - ASTM D2979/71 | 170 |
| Peel adhesion on polyethylene (g/2.5 cm)-PSTC 1 | 1,600 |
| Holding power (hours) - PSTC 7 | 75 |

The Polyten Tack measurement expresses the adhesive capacity and is expressed in grams.

The Peel adhesion measurement expresses the adhesive capacity on polyethylene by peeling at 180° C. and is expressed in grams.

The Holding Power measurement expresses the cohesive capacity measured on steel and is expressed in hours.

EXAMPLE 2

8400 grams of cyclohexane, 43 ml of tetrahydrofuran and 192 grams of styrene are charged into a 25 liter autoclave. The system is thermostat-regulated at 50° C. and 16.5 ml of a 1.5M solution in n-hexane of sec-butyl-lithium are then added.

After 30 minutes, 1008 grams of butadiene are added to the polymeric solution thus obtained and the mixture is then left to react for 15 minutes. 10.1 ml of a 1M solution of monobromoethane in cyclohexane are then added, at a temperature of 95° C., and the mixture is left to react for 15 minutes. The polymer thus obtained has a 1,2 chain percentage in the polybutadiene section equal to 45%.

4800 grams of the polymeric solution thus obtained are then transferred, in an inert atmosphere (argon), to a 16 liter reactor. 0.310 g of bis cyclopentadienyltitanium dichloride and 0.904 g of dibutyl-magnesium suitably premixed in cyclohexane are then added to the above solution. The polymeric solution is then brought into an $H_2$ atmosphere (24 bars) and maintained at a temperature of 100° C., for 60 minutes.

The polymeric solution is then discharged and the antioxidant (Irganox® 1010, 0.1 phr with respect to the dry product) is added. The solvent is removed by distillation in a vapour stream and the polymer is dried in a fluid bed.

The polymer thus obtained has a partially branched structure as indicated in formula 1, and an average molecular weight (Mw) of 90,000 and consists of:

(a) a linear fraction (50%) having a molecular weight of 50,000;
(b) a branched fraction (50%) having a molecular weight of 100,000 to 600,000.

The content of polystyrene with respect to the polymer, measured by means of Fourier transform infra-red spectrometry (FTIR), proved to be 20%. The hydrogenation degree of the polybutadiene section, measured by iodometric titration, is >97%, whereas the polystyrene section has a hydrogenation degree of <1%.

96 parts of a sample of SINVET® 250 polycarbonate and 4 parts of the copolymer sample of example 2, whose preparation is described above, were fed into an ICMA-MC 33 twin-screw extruder (275° C. and 100 rpm of screw revs).

The mixture was injection moulded at 290° C. and 170 bars of pressure. The technological properties were measured on the test-samples thus obtained and are indicated in table 2.

TABLE 2

| Properties | Polycarbonate | Polycarbonate + copolymer ex. 2 |
|---|---|---|
| MFI (g/10 min) | 8.5 | 9.6 |
| Elastic modulus (MPa) | 2.380 | 2.160 |
| Gloss (20° C.) | 70 | 65 |
| Izod (23° C.) J/m | 800 | 750 |
| Izod (−40° C.) J/m | 130 | 660 |

MFI: ASTM D1238
Elastic modulus: ASTM D 1708
Gloss: ASTM D528-85
Izod: ASTM D256

From the data of table 2 there is an evident improvement in Izod at −40° C., a characteristic which is lacking in the polycarbonate as such.

EXAMPLE 3

8400 grams of cyclohexane, 400 grams of butadiene and 400 grams of styrene are charged into a 25 liter autoclave. The system is thermostat-regulated at 50° C. and 18 ml of a 1.5 M solution of sec-butyl-lithium in n-hexane are then added.

After 30 minutes, 5.7 ml of a 1M solution of tetrahydrofuranpropane and 400 grams of butadiene are added to the polymeric solution thus obtained and the mixture is left to react for 15 minutes. 12.5 ml of a 1M solution of bromoethane in cyclohexane are then added, at a temperature of 95° C., and the mixture is left to react for 15 minutes. The linear fraction of the polymer thus obtained has a $B_1T_1A_2B_2$ structure, wherein B is 15% by weight, T is 30% by weight, A is 22% by weight, B is 33%. The branched fraction has a structure as in general formula (II).

The polymer thus obtained has a 1,2 chain percentage in the polybutadiene-1 section equal to 15% and 45% in the polybutadiene-2 section. In addition the percentage of alternating butadiene-styrene, i.e. the T segment in general formula (I), is equal to 20% by weight of the monomer.

4800 grams of the polymeric solution thus obtained are then transferred to a 16 liter reactor in an inert atmosphere (argon). 0.310 g of bis cyclopentadienyltitanium dichloride and 0.904 g of dibutyl-magnesium suitably premixed in cyclohexane are then added; the polymeric solution is then brought into an $H_2$ atmosphere (24 bars) and maintained at a temperature of 100° C. for 60 minutes.

The polymeric solution is then discharged and the antioxidant (Irganox® 1010, 0.1 phr with respect to the dry product) is added. The solvent is removed by distillation in a vapour stream and the polymer is dried in a fluid bed.

The polymer thus obtained, having the same structure as example 1, has an average molecular weight (Mw) of 109,000 and consists of:

(a) a linear fraction (49%) having a molecular weight of 45,000;
(c) a branched fraction (51%) having a molecular weight of 90,000 to 500,000.

80 parts of High Impact polystyrene (HIPS, Edistir® SR 600) and 20 parts of low density polyethylene (LDPE, Ri-blene® FC 40) are fed into a Bandera-type single-screw extruder, at a temperature of 210° C. and 100 rpm. The blend was injection moulded at 210° C. and the characteristics are indicated in table 3.

Using the same extruder and under the same conditions as above, a second composition is prepared using 70 parts of HIPS, 20 parts of LDPE and 10 parts of the copolymer of example 3 prepared as described above. The blend was injection moulded at 210° C. and the characteristics are indicated in table 3. The MFI measurement was effected according to ASTM D 1238, the ultimate tensile strength and elongation to break measurements according to ASTM D 638, the flexural modulus measurement according to ASTM D 790 and the Izod measurement according to ASTM D256.

TABLE 3

|  | HIPS + LDPE | HIPS + LDPE Copolymer |
|---|---|---|
| MFI (g/10 min) | 4.7 | 4.6 |
| Ult. Tens. Strength (MPa) | 20 | 21.4 |
| Elongation to break (%) | 40 | 42 |
| Flexural modulus MPa | 1.160 | 1.130 |
| Izod at 23° C. (J/m) | 50 | 120 |

The data of table 3 demonstrate the improvement of Izod at 23° C. using the copolymer of example 3 of the present invention.

What is claimed is:

1. A composition consisting of vinylarene/hydrogenated diene block copolymers, the latter being selected from ethylene-butene and ethylene-propylene, consisting of:

(a) from 30% to 60% by weight of copolymers having linear structures;
(b) from 70% to 40% by weight of copolymers having branched structures;
the sum of components (a) and (b) being equal to 100; the weight average molecular weight of the above composition ranging from 30,000 to 400,000.

2. The composition according to claim 1, wherein copolymers (a) are from 35 to 50% and copolymers (b) are from 65 to 50%.

3. The composition according to claim 1, wherein the weight average molecular weight ranges from 50,000 to 200,000.

4. The composition according to claim 1, wherein the vinylarene content ranges from 2 to 75%.

5. The composition according to claim 4, wherein the vinylarene content ranges from 5% to 40%.

6. The polymeric composition according to claim 1, wherein the vinylarene is styrene.

7. The polymeric composition according to claim 1, wherein:

the linear fraction has structures selected from $(A-B)_a$ and $(B-TA-B)_a$ wherein "a" indicates the number of blocks and is an integer from 1 to 3;

the branched fraction has structures selected from those having general formula (I)

(I)

wherein:
1) A is the polyvinylarene block;
2) b is the monomeric unit of hydrogenated diene, selected from ethylene-butene and ethylene-propylene;
3) x is the number of monomeric units which form the ethylene-butene or ethylene-propylene block;
4) B is the hydrogenated polydiene block $-(b)_x-$;
5) n is the number of branches of the copolymer and is an integer ranging from 1 to 5;
6) B—A is the block copolymer grafted onto the hydrogenated polydiene fraction $-(-b-)_x-$;

or from those having general formula (II):

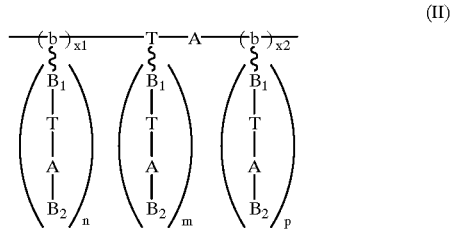

(II)

wherein:
7) A, B and b have the meaning defined above;
8) $x_1$ and $x_2$ are the number of hydrogenated diene monomeric units which form the two ethylene/butene or ethylene/propylene blocks;
9) T is the statistic terpolymer consisting of vinylarene/ethylene-butene or vinylarene/ethylene-propylene, the content of T being from 0 to 30% by weight of the compound having general formula (II);
10) $-B_1-T-A-B_2$ is the block copolymer grafted onto $-(-b-)_{x1}-T-A-(-b-)_{x2}-$;
11) (m+n+p) is the number of branches of the copolymer $-B_1-T-A-B_2$ grafted and ranges from 1 to 5.

8. A process for the preparation of the polymeric composition according to claim 1, which comprises:

a) reaction of a vinylarene, alone or mixed with a conjugated diene, with an organo-derivative of Lithium having the general formula R—Li wherein R is a monofunctional hydrocarbon radical selected from aliphatic and cycloaliphatic radicals with from 2 to 20 carbon atoms;

b) reaction of the mixture coming from step (a) with a conjugated diene;

c) reaction of the mixture coming from step (b) with a bromo-derivative having the general formula R'—Br in an essentially stoichiometric quantity with respect to the Lithium, wherein R' is a $C_1$-$C_{10}$ monofunctional hydrocarbon radical selected from alkyl, cycloalkyl and aryl radicals; thus obtaining a composition of non-hydrogenated block copolymers;

d) hydrogenation of the polydiene section of the composition of non-hydrogenated block copolymers obtained in step (c) to give the composition of hydrogenated block copolymers according to claim 1.

9. The process according to claim 8, wherein the vinylarene is styrene and the conjugated diene is selected from isoprene and butadiene.

10. The process according to claim 8, wherein R' is a $C_1$-$C_3$ alkyl radical.

11. A formulation of adhesives and seals comprising the polymeric composition according to claim 1.

12. A polymeric composition comprising engineering polymers, selected from polyesters, polyamides and polycarbonates, and the mixture of block copolymers according to claim 1.

13. A polymeric composition comprising polyethylene, polystyrene and the mixture of block copolymers according to claim 1.

14. The process as claimed in claim 9, wherein said conjugated diene is butadiene.

15. The process as claimed in claim 10, wherein said alkyl radical is ethyl.

16. The polymeric composition as claimed in claim 12, comprising polycarbonate.

* * * * *